Dec. 3, 1963  A. MUSSCHOOT  3,112,922
STABILIZED AIR SPRING
Filed Feb. 15, 1960  3 Sheets-Sheet 1
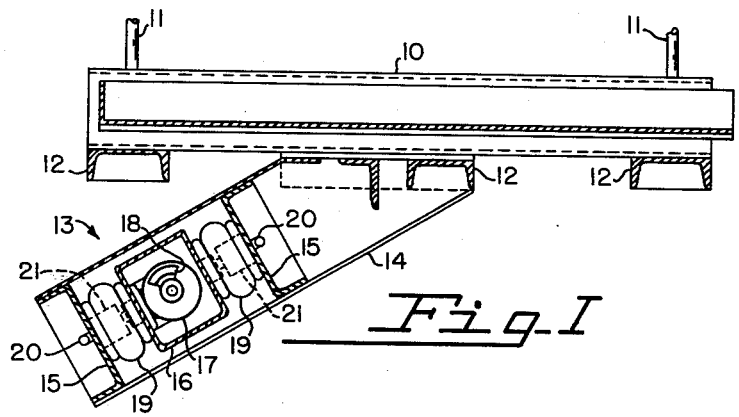
Fig. I
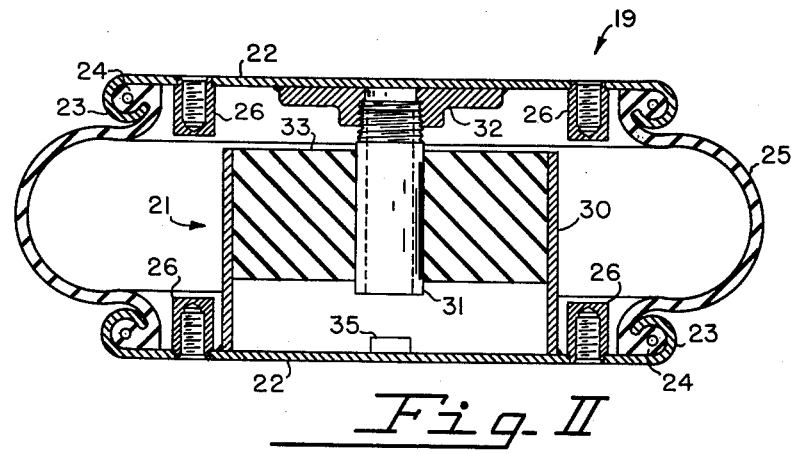
Fig. II
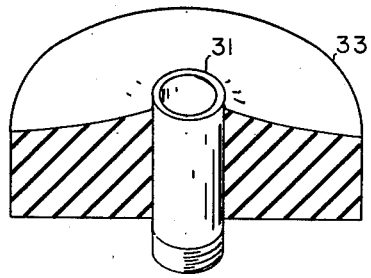
Fig. III
INVENTOR.
ALBERT MUSSCHOOT
BY
Marshall, Marshall & Yeasting
ATTORNEYS Dec. 3, 1963   A. MUSSCHOOT   3,112,922
STABILIZED AIR SPRING
Filed Feb. 15, 1960   3 Sheets-Sheet 2
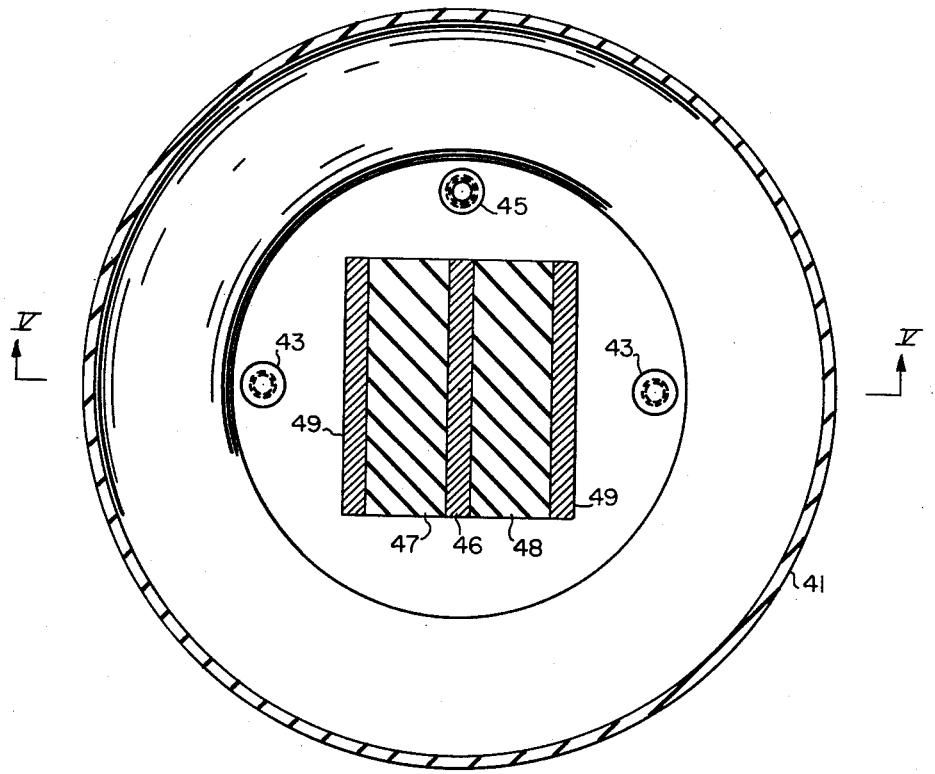
Fig. IV
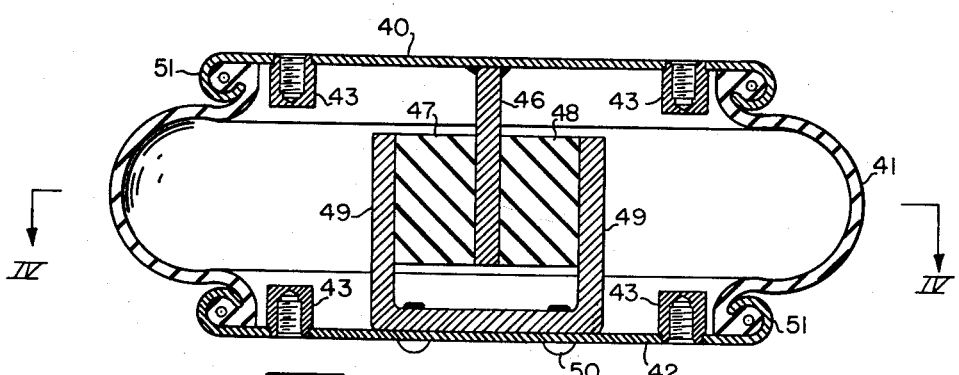
Fig. V
INVENTOR.
ALBERT MUSSCHOOT
BY
Marshall, Marshall & Yeasting
ATTORNEYS Dec. 3, 1963 A. MUSSCHOOT 3,112,922
STABILIZED AIR SPRING
Filed Feb. 15, 1960 3 Sheets-Sheet 3
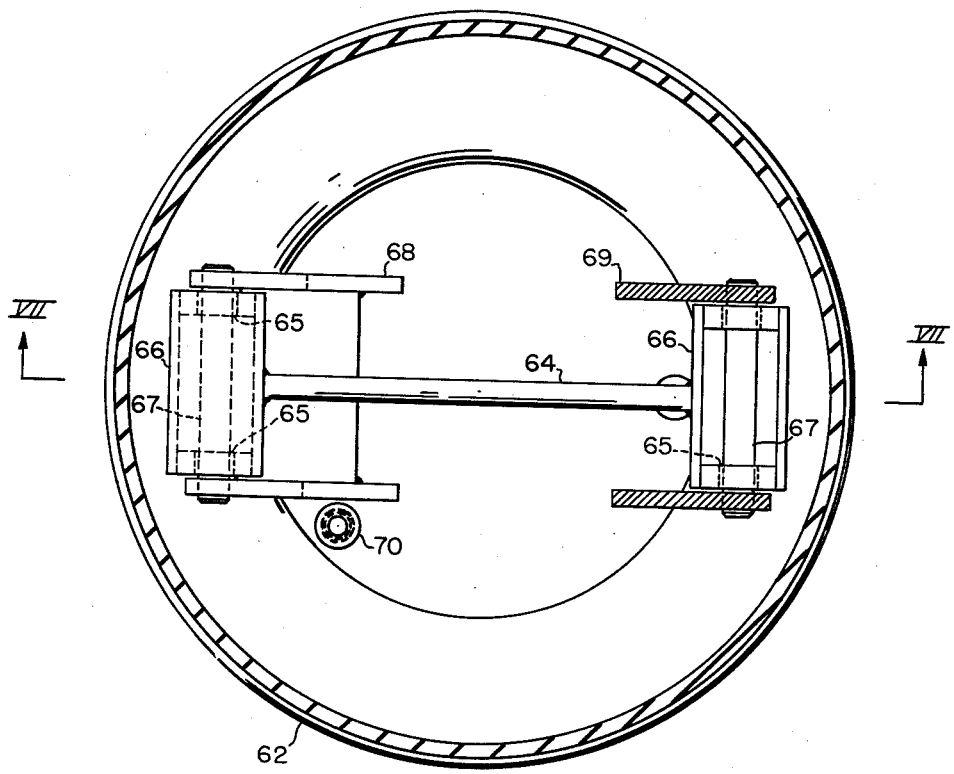
Fig. VI
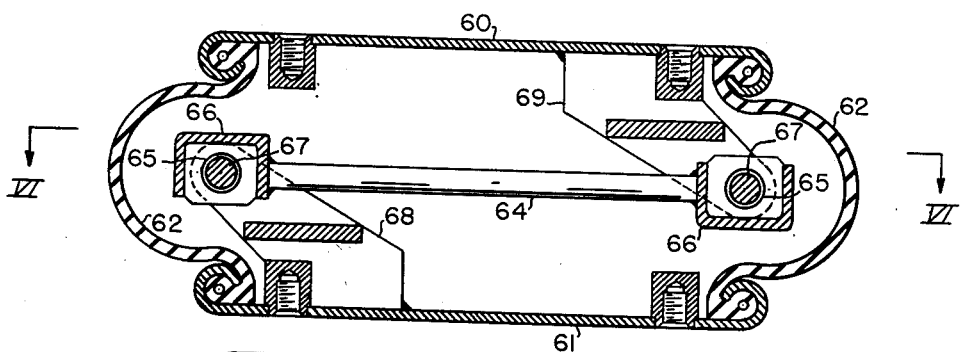
Fig. VII
INVENTOR.
ALBERT MUSSCHOOT
BY
Marshall, Marshall & Yeasting
ATTORNEYS

United States Patent Office 3,112,922
Patented Dec. 3, 1963

3,112,922
STABILIZED AIR SPRING
Albert Musschoot, Anchorage, Ky., assignor to Chain Belt Company, Milwaukee, Wis., a corporation of Wisconsin
Filed Feb. 15, 1960, Ser. No. 8,734
5 Claims. (Cl. 267—1)

This invention relates to vibratory apparatus and in particular to an improved resilient element having large load carrying capacity, an adjustable spring rate, small mass, and relatively large lateral stiffness.

In the manufacture of large capacity vibratory work forming equipment the resilient elements have always been the factor limiting the size of the equipment. If steel springs are employed the limit of allowable fiber stress in the steel springs to avoid fatigue failure requires that the springs be quite large and heavy and as a result are often incapable of vibrating at the desired amplitude and frequency of vibration. Furthermore, such steel springs are heavy and occupy a considerable amount of space in the apparatus.

Inflated air chambers having flexible side walls make satisfactory substitutes for the steel springs and in fact provide the required spring rate and load carrying capacity without the mass inherent in the equivalent steel springs. However, the flexible side wall air chamber (commonly called an air spring), particularly when operated at a low pressure, has a very low resistance to lateral deflection of the supported elements.

The principal object of this invention is to provide a simple, economical, resilient, lateral stabilizer that not only accommodates a full vibratory motion of the air spring in the desired direction but which also provides lateral stability to prevent lateral motion of the spring elements with respect to each other.

Another object of the invention is to provide a lateral stabilizer for an air spring which stabilizer is completely enclosed within the air spring.

Another object of the invention is to provide a simple, economical stabilizer for an air spring which also has a substantial volume of its own to reduce the air volume within the air spring and thus increase its effective spring rate for a given pressure.

Another object of the invention is to provide a lateral stabilizer for an air spring which stabilizer has different spring rates along different axes of lateral motion.

A still further object of the invention is to provide a linkage mechanism that is completely enclosed within an air spring and which provides lateral stability for the elements of the air spring.

More specific objects and advantages are apparent from the following description of preferred forms of the invention.

According to the invention the improved resilient element for vibratory apparatus comprises an air chamber having rigid ends and a flexible side wall and guide means which may include a rubber, or other elastomer, link or a metal link joining portions of the rigid end members of the composite air spring and preventing substantial lateral motion of one such end member with respect to the other.

Preferred forms of the invention are illustrated in the accompanying drawings.

In the drawings:

FIG. I is a longitudinal vertical section taken near one side of the apparatus showing a vibratory work performing apparatus embodying the improved resilient elements or air springs.

FIG. II is an enlarged vertical section of one of the improved resilient elements employing a symmetrical stabilizer.

FIG. III is a vertical section in pictorial form of the improved elastomer element of the stabilizer assembly shown in FIG. II.

FIG. IV is a horizontal section taken along the line IV—IV of FIG. V showing a non-symmetrical form of lateral stabilizer for use in an air spring.

FIG. V is a vertical section taken along the line V—V of FIG. IV showing the arrangement of the parts of the stabilizer.

FIG. VI is a horizontal section taken along the line VI—VI of FIG. VII showing a metallic linkage stabilizer incorporated in an air spring.

FIG. VII is a vertical section taken substantially along the line VII—VII of FIG. VI showing the general arrangement of the metallic stabilizer.

These specific figures and the accompanying description are intended merely to illustrate the invention and not to impose limitations on its scope.

One common example of vibratory apparatus in which resilient elements constructed according to the invention may be advantageously employed is illustrated in FIG. I. In the apparatus shown in FIG. I, a vibratory conveyor or feeder trough 10 is supported by resilient links 11 which may be tie rods extending to spring supports (not shown) located above the feeder or may be elastic isolators or other support means that permit the feeder trough 10 to vibrate without transmitting substantial vibratory force to the supports. The vibratory trough 10 includes a plurality of cross members 12 shown as channel irons and a vibration generator assembly 13 is connected to the trough and to one of such cross members 12. The assembly 13 comprises a rigid frame 14 extending diagonally downwardly and to the left from the central portion of the feeder trough 10. This assembly 13 includes a pair of rigid cross members 15 in the form of shallow reinforced channel irons having their flat sections facing each other and spaced apart a sufficient distance to accept a vibration exciter 16 forming part of the generator assembly 13.

A motor 17 is mounted in the exciter 16 and carries eccentric weights 18 on each end of its armature shaft so that when the motor is operated it supplies vibratory force to the exciter 16. The exciter 16 is resiliently mounted in the vibrator assembly 13 by means of a plurality of resilient members in the form of air bags or air springs 19 which may be inflated to vary their rates by means of air pressure applied through lines 20. The air springs are adjusted to exhibit a spring rate such that the vibratory system comprising the trough 10 and frame 14 as one mass, the exciter 16 including the weight of the motor 17 as the second mass, and the air bags 19 as the resilient elements has a natural frequency substantially at the operating speed of the motor 17.

The air springs 19 have internal stabilizers 21 to resist lateral deflection of the air springs 19 and thus prevent the exciter member 16 from sagging downwardly out of line with the center of the frame 14.

One of the air springs 19 including its stabilizer 21 is shown in greater detail in FIGURES II and III. The air spring 19 comprises a pair of rigid end plates 22 that are circular in plan and have rolled edges 23 that grip beads 24 on the margins of an annular, semi-torus shaped flexible but non-stretchable side wall 25. The side wall 25 is preferably made of a fabric reinforced elastomer such as rubber so as to be freely flexible but yet impervious to air. The rigid end plates 22 are provided with threaded sockets 26 to receive bolts by means of which they may be secured to adjacent elements of the vibratory system.

The stabilizer 21 to prevent lateral deflection of one of the end plates 22 with respect to the other comprises, in the form shown in FIG. II, a cylindrical casing 30 welded to and extending upwardly from the lower one of the end plates 22 approximately three quarters of the distance from that end plate to the upper one of the end plates 22. A centrally located rod 31, which may be in the form of a pipe, is threaded into and extends downwardly from a pipe flange 32 rigidly attached to the upper one of the end plates 22. An annulus of rubber or similar elastomeric material 33 is bonded to the central pin or pipe 31 and is compressed radially to fit into the cylindrical member 30. The resilient annulus 33 is shown in its free or unstressed condition in FIG. III and as shown therein it has its maximum thickness adjacent the pin or pipe 31 and gradually decreases in thickness with increase in radius. In a practical embodiment of the invention the radial thickness of the resilient annular member 33 is reduced about 12 percent in compression from the free form shown in FIG. III to the compressed form when the annulus is pushed into the cylinder 30. At the same time the axial thickness at the outer margin is increased by 30 percent of the unstressed axial thickness at the margin. With this amount of compression using a resilient material having elasticity corresponding to rubber of a 45 durometer rating the radial pressure exerted against the inside of the cylinder 30 is sufficient to prevent slippage of the annular resilient member 33 with respect to the cylinder 30 when subjected to the normal amplitudes of vibratory motion.

To avoid trapping air in the cylinder 30 beneath the resilient annular member 33 the cylinder 30 is provided with ventilating holes 35 cut in the lower portion of the side walls of the cylinder 30 adjacent the lower one of the end members 22.

This arrangement of a stabilizer inside the air spring provides high strength against lateral deflection of the members without at the same time unduly increasing the stiffness or rate of the resilient assembly or spring in the direction of vibratory motion. The radial compression of the annular resilient member 33 tends to provide a force tending to push the pipe or pin 31 upward or downwardly away from the central neutral position with a force that varies with the axial displacement of the pin from its neutral position. Since this force is in the nature of a negative spring rate it opposes the natural shear resistance of the rubber tending to prevent such motion axially of the assembly.

This particular assembly is symmetrical with respect to the axis of the pipe or pin 31 and thus supplies uniform resistance to lateral motion between the end members 22 regardless of the direction of such radial motion. This is particularly advantageous in portable equipment and allows a great flexibility in the placement of the units in that it is immaterial in which orientation they may be placed.

If it is unnecessary or undesirable to have uniform lateral stability in all directions as is provided by the structures shown in FIGS. II and III a stabilizer may be arranged as shown in FIGS. IV and V. As shown in these figures, an upper end member 40 similar to the upper one of the end members 22 is connected through a flexible side wall 41 to a lower end member 42. As before, internally threaded sockets 43 are provided to receive bolts by which the air spring end members 40 and 42 are attached to adjacent parts of the vibratory structure. An inlet connection 45 to receive an air supply line such as one of the lines 20 shown in FIG. I is included in one of the plates 40 or 42.

The lateral stabilizer in this case comprises a tongue 46 welded to and depending from the upper end member 40 with its lower portion sandwiched between a pair of rubber blocks 47 and 48 which in turn are compressed between the interior faces of a U-shaped bracket 49 the bottom of which is attached by means of screws 50 to the lower end member 42. In this arrangement the structure is assembled by compressing the rubber blocks 47 and 48 which are attached or bonded to either side of the tongue 46 into the U-shaped bracket 49 before it is installed on or attached to the lower end member 42. The places are all assembled and the screws 50 are tightened to hold the parts together. Then with the assembly held by the rubber blocks 47 and 48 the end members 40 and 42 are spun between forming rolls and the rims 51 rolled into clamping position on marginal beads of the flexible side wall 41.

This assembly is quite similar to the assembly of the structure shown in FIGS. II and III in which the cylinder 30 is welded or otherwise permanently attached to the lower end member 22 of the resilient element and the pipe 31 is threaded into the pipe flange 32 attached to the upper one of the end members 22 before the edges 23 of the members 22 are rolled into position to clamp the beads 24.

The stabilizer shown in FIGS. IV and V, as mentioned before, is not symmetrical but exhibits a relatively high spring rate or restoring force in the lateral direction that tends to compress one of the rubber members 47 and allow the other to expand. The lateral spring rate in a direction parallel to the tongue 46 stresses the rubber blocks in shear and in this direction the stabilizer is quite weak. Likewise the stabilizer is quite weak, i.e. exhibits a low spring rate, in the direction of vibratory motion in which the end members 40 and 42 approach and recede from each other. Air springs constructed with this type of stabilizer are best employed in positions in which the tongue 46 is as near horizontal as possible.

In the two previous embodiments the stabilizer for preventing lateral deflection of the elements of the resilient member comprises rubber or similar material stressed in compression to resist the lateral motion. It is also possible to employ a metallic member in the form of a link connecting the two end members of the resilient element to accomplish substantially the same result. This arrangement is shown in FIGS. VI and VII in which the resilient member comprises an upper end plate 60, a lower end plate 61, and a flexible non-stretchable side wall 62 connecting the end members to form an expansible pneumatic chamber. This assembly also includes internally threaded sockets serving as anchorage points or nuts for bolts that attach the end members 60 or 61 to other portions of the vibratory equipment.

In this example the stabilizing means comprises a metal link 64 having spaced apart rigidly mounted bearings 65 mounted in each end of side arms 66 extending laterally from each end of the central link portions 64. The bearings 65 engage pins 67 that are mounted in bracket 68 and 69 erected from the lower base 61 and upper base 60 respectively.

In this arrangement the link 64 is parallel to the surfaces of the end members 60 and 61 when the expansible chamber is in its average or midposition and rocks upwardly or downwardly to accommodate relative motion between the end members 60 and 61. The brackets 68 and 69 may be welded or otherwise securely attached to the end members 60 and 61. The width of the arms 66 at each end of the link 64 space the bearings 65 to withstand any twisting motion of one of the end members with respect to the other. This arrangement thus provides the mechanical lateral rigidity of the solid link 64 while easily permitting the vibratory motion between the end members 60 and 61.

One of the end members 60 or 61 is provided with a nipple 70 to which an air supply line may be attached for inflating the air spring.

In each of the embodiments illustrated the internal structure added to the conventional expansible chamber or air spring compensates for the inherent lateral weakness of the flexible side wall so that these resilient elements may be used in vibratory apparatus without requiring the use of external guides, cantilever springs, or similar expedients to maintain the relatively moving vibratory members in their proper spatial relation. These stabilizer assemblies, by being completely enclosed in the expansible chambers, are completely protected from deleterious environmental effects as well as saving the space ordinarily required for outside guide means. An additional advantage exhibited by the first two embodiments is the very material reduction in the gas volume of the resilient or expansible chamber thus raising its compression ratio and thereby achieving a substantially higher spring rate without a corresponding increase in average gas pressure in the air spring.

Another advantage that may be obtained in the improved stabilizing structure is the proportioning of the rubber or resilient stabilizing elements so that they contribute known and desired forces to affect the spring rate of the entire assembly. In this form the entire assembly may have a spring rate which is determined in part by the rubber operating in shear and adjusted to provide the minimum required spring rate of the assembly and in part by the additional spring effect provided by the gas under pressure in the expansible chamber.

Various modifications of this structure may be constructed employing the principles set forth without departing from the spirit and scope of the invention.

Having described the invention, I claim:

1. In a resilient element for a vibratory system, in combination, an expansible chamber having flexible side walls and rigid ends, a rigid wall erected from one of said ends and having a side normal to said end, a tongue rigidly attached to the other of said ends, and an elastomeric block interposed and compressed between said side of said rigid wall and a side of said tongue.

2. In a resilient element for a vibratory system, in combination, an expansible chamber having flexible side walls and a pair of rigid ends, a rigid wall structure erected from one of said rigid ends, said wall structure having spaced opposing surfaces extending normal to said rigid ends, a tongue rigidly attached to the other of said rigid ends and interposed between said opposing surfaces of said wall structure, and an elastomer member interposed and compressed between a side of the tongue and an adjacent one of said opposing surfaces.

3. In a resilient element for a vibratory system, in combination, an expansible chamber having flexible side walls and a pair of rigid ends, a rigid cylindrical wall structure erected from one of said rigid ends, a tongue attached to the other of said rigid ends and extending generally along the axis of the cylindrical wall, and an elastomer member held in compression between the cylindrical wall and the tongue.

4. In a resilient element for a vibratory system, in combination, an expansible chamber having flexible side walls and a pair of rigid ends, a pair of spaced opposed walls erected from one of the rigid ends, a generally flat tongue erected from the other of the rigid ends and interposed between the pair of walls, and elastomer members interposed and compressed between said opposed walls and the flat tongue.

5. In a resilient element for a vibratory system, in combination, an expansible chamber having flexible side walls and rigid ends, rigid members rigidly attached to said rigid ends and having opposing surfaces normal to said ends, and an elastomer spring interposed between and engaged with said opposing surfaces, whereby relative lateral motion of said rigid ends is opposed by said elastomer spring.

References Cited in the file of this patent

UNITED STATES PATENTS

| 1,579,185 | Weiland | Mar. 30, 1926 |
| 1,579,188 | Weiland | Mar. 30, 1926 |
| 2,305,814 | Schieferstein | Dec. 22, 1942 |
| 2,356,962 | Williams | Aug. 29, 1944 |
| 2,747,862 | Gouirand | May 29, 1956 |
| 2,912,234 | Candlin | Nov. 10, 1959 |

FOREIGN PATENTS

| 524,287 | Great Britain | Aug. 2, 1940 |
| 698,953 | Great Britain | Oct. 28, 1953 |